United States Patent [19]
Pikkujämsä et al.

[11] Patent Number: 5,855,736
[45] Date of Patent: *Jan. 5, 1999

[54] METHOD OF REDUCING CORROSION IN A POWER BOILER OF A PULP MILL

[75] Inventors: Esa Pikkujämsä; Keijo Salmenoja, both of Tampere; Kari Mäkelä, Kangasala; Jouni Kinni, Tampere, all of Finland

[73] Assignee: Kvaerner Pulping Oy, Tampere, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 738,522

[22] Filed: Oct. 28, 1996

[30] Foreign Application Priority Data

Nov. 6, 1995 [FI] Finland ................................ 955332

[51] Int. Cl.$^6$ ................................................. D21C 11/06
[52] U.S. Cl. ........................... 162/14; 162/29; 110/238; 422/185
[58] Field of Search ........................ 110/238; 422/185; 162/14, 15, 16, 30.11, 36, 29

[56] References Cited

U.S. PATENT DOCUMENTS

| | | | |
|---|---|---|---|
| 3,396,076 | 8/1968 | Crosby et al. | 162/33 |
| 3,654,071 | 4/1972 | Brannland et al. | 162/33 |
| 5,124,135 | 6/1992 | Girrbach et al. | 423/241 |
| 5,201,172 | 4/1993 | Hakulin et al. | 60/39.05 |
| 5,277,759 | 1/1994 | Sannholm | 162/16 |

FOREIGN PATENT DOCUMENTS

| | | |
|---|---|---|
| 1064206 | 10/1979 | Canada . |
| 435302 | 2/1995 | Canada . |
| WO 95/03449 | 2/1995 | WIPO . |

OTHER PUBLICATIONS

B. Warnqvist et al., Removal of chloride from recovery systems by reactions with sulfur dioxide.

*Primary Examiner*—Stanley S. Silverman
*Assistant Examiner*—Dean T. Nguyen
*Attorney, Agent, or Firm*—Rockey, Milnamow & Katz, Ltd.

[57] ABSTRACT

Method of reducing corrosion in a power boiler of a pulp mill using biofuel and suspended matter obtained from the waste water treatment of the mill. In the method flue gases obtained from a waste heat boiler are fed into the power boiler, causing the sulfur dioxide contained in them to react with the alkali chlorides in the boiler and the chlorine to form hydrogen chloride.

12 Claims, 1 Drawing Sheet

METHOD OF REDUCING CORROSION IN A POWER BOILER OF A PULP MILL

TECHNICAL FIELD OF THE INVENTION

The invention relates to a method of reducing corrosion in a power boiler of a pulp mill, the boiler using as fuel biofuel and suspended matter obtained from the waste water treatment of the mill.

BACKGROUND OF THE INVENTION

Considerable quantities of waste water are produced from pulp production, and environmental regulations stipulate that it has to be treated and suspended matter must be removed before it is led into the water system. The waste water is usually first led to treatment where most of the suspended matter therein separates and settles as sludge to the bottom of a settling pond. Hereafter the water is led to biological purification whereby suspended matter is also obtained. Both of these formed suspended matters are recovered and dried either by a press or in some other known manner. The formed sludge is led into a boiler, which typically is e.g. a bark fired boiler or the like, operating as the power boiler of the pulp mill. The chlorine content of the suspended matter obtained from the waste water is significant, the chlorine originating either from the bleach plant or from the wood used. The sulfur content in normal power boiler fuel, such as bark obtained from the debarking plant, is very low. As a result, a situation arises in the power boiler wherein the chlorine in the sludge reacts with the alkaline material entering the boiler, such as potassium, sodium and calcium, forming alkali chlorides which cause corrosion in the boiler heat transfer surfaces. This problem occurs especially in bubbling fluidized bed boilers, wherein the formed alkali chlorides are driven together with fly ash and flue gas onto the heat transfer surfaces of the boiler. As the alkali chlorides lower the melting temperatures of the ash sediments on the boiler heat transfer surfaces, they cause and enhance molten phase corrosion in their materials. In the long run this results in the formation of leakage in the boiler tubes, causing shutdown.

Materials that are very resistant to corrosion phenomena or materials causing corrosion are typically used in attempts to stop corrosion. Materials that are resistant to chlorine-induced corrosion have been used in power boilers. To use these materials is, however, quite costly, and superior materials do not eliminate corrosion, but only slow its progress owing to their superior resistance to corrosion. Consequently, materials with superior corrosion resistance have not in practice proved sufficiently effective in preventing chlorine-induced corrosion.

U.S. Pat. No. 5,124,135 discloses a process for removing elementary chlorine from gaseous mixtures of $Cl_2$ and $Br_2$. In this process gaseous sulfur dioxide is added to a gas mixture containing chlorine and steam, and then the mixture is cooled until a purified gas is obtained. The publication states that as a result also water drops are obtained, but the mechanism of the chlorine removal reaction is not disclosed. The significance and role of sulfur dioxide in the reaction also remains unclear.

The Finnish Patent Application 933,336 discloses a method of adjusting the sulfur balance in a sulphate pulping process, wherein chlorides in the chemical recovery loop are removed in a recovery boiler by feeding sulfurous odor gases as such into the boiler. This aims at invoking a reaction between sulfur and chlorine to separate the chlorine in gaseous form. Adjusting the chemical recovery loop in a pulping process and the thereto related recovery boiler burning are as such a fully different kind of technique than the present invention applies to. Furthermore, the solutions in this application cannot as such be applied to a power boiler using biofuel, since the processes and conditions therein are substantially different.

SUMMARY OF THE INVENTION

The object of the present invention is to provide a method of reducing corrosion caused by chlorine in a boiler using biofuel and sludge.

The method of the invention is characterized in that flue gases containing sulfur dioxide are fed into a power boiler, the gases being obtained by burning such an amount of odor gases from the pulping process that the formed alkali chlorides will form hydrogen chloride, which may be removed from the power boiler in gaseous form.

It is an essential idea of the invention that existing equipment and material of a pulp mill is utilized to simply and easily eliminate corrosion. Feeding a sufficient amount of flue gases containing sulfur dioxide obtained from a waste heat boiler into a bark fired boiler or other power boiler burning sludge and other biofuel results in a reaction in the boiler furnace, wherein sulfur dioxide reacts with the alkali chlorides generated in the boiler, forming solid alkali sulphates. While drifting with ash, these alkali sulphates do not significantly lower the melting temperature of ash sediments. This leads to the transformation of chlorides into hydrogen chloride, which does not either cause significant molten phase corrosion. It may also be removed from the flue gases e.g. with a flue gas scrubber or some other suitable means. Accordingly, there is no need for costly corrosion resistant special materials, as corrosion may be easily eliminated by using a sufficient amount of sulfur. At the same time, the sulfur dioxide conveyed with the odor gases can be efficiently utilized, as far as it is used for this purpose.

BRIEF DESCRIPTION OF THE DRAWING

The invention will be described in detail in the accompanying drawing, FIG. 1 which is a schematic presentation of the method of the invention applied to a pulp mill.

Figure 1:
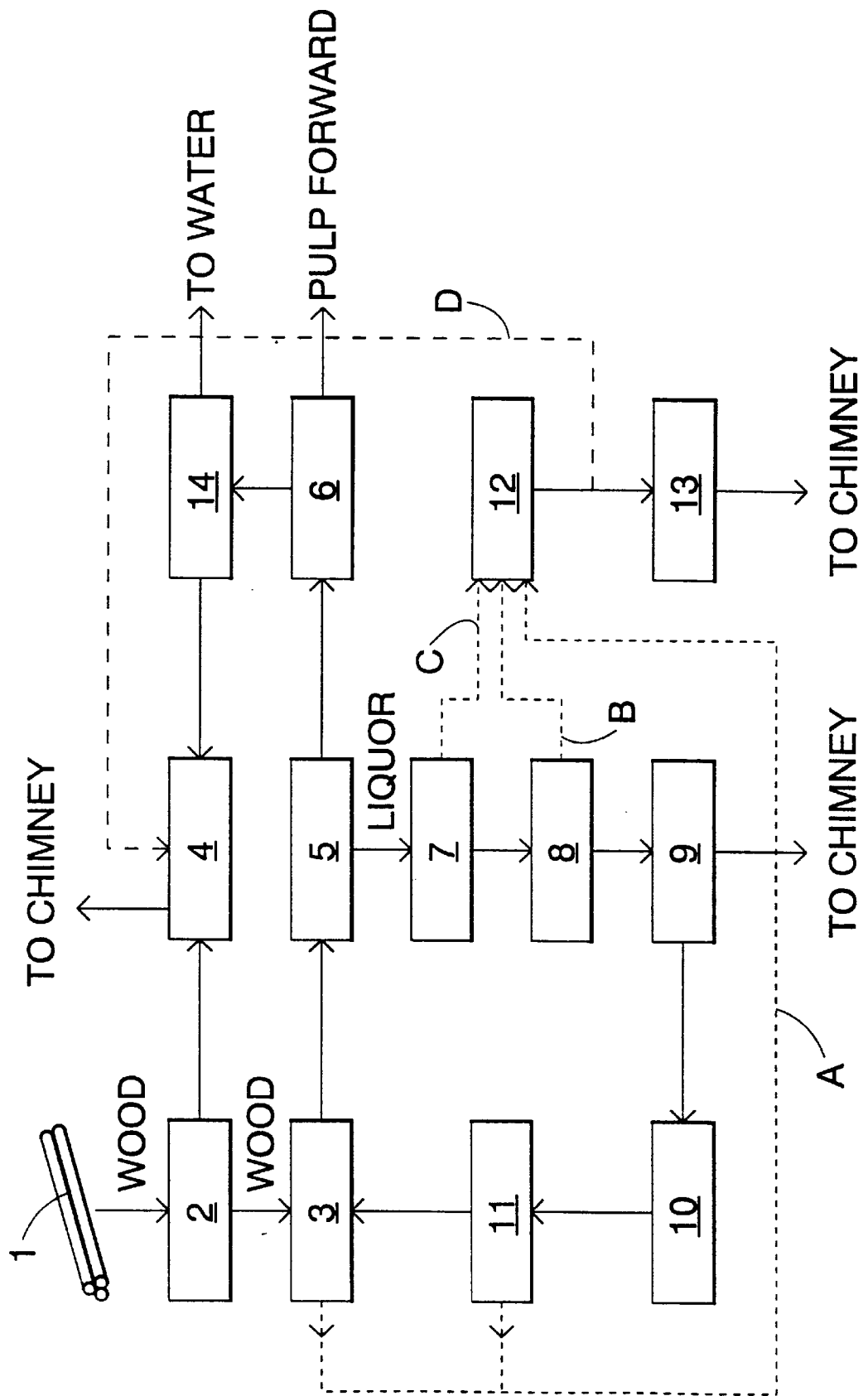
FIG. 1 shows a normal pulp mill process, wherein wood 1 goes to mechanical processing 2. Here the wood 1 is debarked, whereafter the wood material is led to pulp digesting 3 and the bark is led to a power boiler 4. The pulp obtained from pulp digesting goes to pulp washing 5 and on to bleaching 6. From pulp washing 5 the black liquor obtained from digesting goes to an evaporating plant 7 for dewatering. From the evaporating plant 7 the black liquor goes on via heat treatment 8 to a soda recovery boiler 9 for burning. Older pulp mills have no heat treatment 8 and it can be omitted if desired. The flue gases obtained from burning in the soda recovery boiler 9 are led on to possible finishing and thereafter to a chimney. The smelt obtained from the burning in the recovery boiler is led on to a smelt dissolving tank 10, from where it is led, dissolved in an aqueous solution, to causticizing 11 and further as digesting chemicals to pulp digesting 3. Pulp digesting and the soda recovery boiler, and the processes and equipment related thereto are fully known per se in the branch and to those skilled in the art and are hence not described more closely.

In the separate process steps many different sulfurous odor gases, such as $H_2S$, $CH_3HS$, $(CH_3)_2S$ and $(CH_3)_2S_2$ are generated, which cannot be released as such to the atmosphere because of current environmental regulations and protective reasons. Such odor gases are generated for example in pulp digesting 3, in the evaporating plant 7, in heat treatment 8 and in causticizing 11. For treatment they are led in a manner shown by broken lines A to C to a separate waste heat boiler 12 for burning. The formed flue gases are led normally to a scrubber 13 for washing with e.g. an alkaline solution, and are thereafter released to the atmosphere.

From bleaching 6 the pulp goes on to processing and the liquid remaining from bleaching goes on to waste water treatment 14. In waste water treatment 14 suspended matter separates in either one or more steps. Usually this involves separate clarification, wherein most of the suspended matter separates from the waste water, followed by biological purification, wherein more suspended matter is formed and separated. The purified water is led from waste water treatment 14 to the water way and the sludge formed is dried and fed into the power boiler 4 for burning. In accordance with the invention, at least part of the flue gases in the waste heat boiler are led in a manner shown by a broken line D to the power boiler. The sulfur dioxide in the flue gases reacts in the boiler in accordance with the following reaction equations:

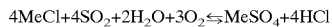

wherein Me=an alkali metal (Na, K).

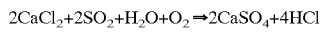

In practice it has been recognized that to assure that alkali sulphate is formed, the S/Cl ratio must be greater than the molar ratio according to the reaction equation, preferably not less than 4.

If the flue gases are fed into the power boiler 4 at a sufficiently low level to its lower portion, the sulfur dioxide has time for sufficient reaction with the alkali chlorides. Thus, a sufficiently long residence time is achieved for the reactions and the alkali chlorides and the sulfur dioxide have time to react and form solid alkali sulphates. In the reaction hydrogen chloride is also generated and is easy to remove from the flue gases e.g. by means of a usual scrubber. The flue gases in the power boiler are led from the power boiler e.g. to a scrubber or in some other manner to finishing and purification and thereafter in a known manner to a chimney to be released to the atmosphere.

The invention has been presented in the description and in the drawing by way of example only, and it is not in any way restricted to it. As power boiler may be used any kind of power boiler, into which bark disposal and secondary sludge received from waste water treatment is fed for burning. This may involve a conventional power boiler or a fluidized boiler. Furthermore, part or all of the flue gases from the waste heat boiler can be fed into the power boiler as needed on the basis of the amount of cumulated chloride. The method of the invention only needs a duct leading from the flue gas duct of the waste heat boiler to the power boiler for feeding the flue gases therein.

We claim:

1. A method of reducing molten phase corrosion in a power boiler of a pulp mill having a separate boiler, the power boiler using fuel that produces alkali chlorides when burned, wherein the method comprises the steps of (a) burning in the power boiler biofuel that produces alkali chlorides when burned, (b) burning in the separate boiler odor gases originating from a pulping process to obtain flue gases containing sulfur dioxide, and (c) feeding said flue gases containing sulfur dioxide, from the separate boiler, into the power boiler burning biofuel, so that sulfur dioxide in said flue gases reacts with alkali chlorides to yield hydrogen chloride in the power boiler.

2. The method of any preceding claim wherein the separate boiler is a waste heat boiler.

3. A method of reducing molten phase corrosion in a power boiler of a pulp mill having a separate boiler, the power boiler using as fuel biofuel and suspended matter obtained from waste water treatment of the pulp mill, so that alkali chlorides are produced in the power boiler, wherein the method comprises the steps of (a) burning in the power boiler biofuel and suspended matter obtained from waste water treatment of the pulp mill, so that alkali chlorides are produced in the power boiler, (b) burning in the separate boiler odor gases originating from a pulping process to obtain flue gases containing sulfur dioxide, and (c) feeding said flue gases containing sulfur dioxide, from the separate boiler, into the power boiler burning biofuel, so that sulfur dioxide in said flue gases reacts with alkali chlorides to yield hydrogen chloride in the power boiler.

4. The method of claim 3, wherein the flue gases fed into the power boiler are of an amount that produces alkali chlorides, said alkali chlorides are produced in an amount that forms hydrogen chloride, and said hydrogen chloride is removable from the power boiler in gaseous form.

5. The method of claim 4, wherein the amount of flue gases fed into the power boiler produces a S/Cl ratio not less than 4.

6. The method of claim 1, wherein substantially all odor gases are burned in a waste heat boiler and all flue gases from the waste heat boiler are fed into the power boiler.

7. The method of claim 3, wherein the odor gases to be burned comprise at least one of the following substances: $H_2S$, $CH_3HS$, $(CH_3)_2S$ and $(CH_3)_2S_2$.

8. Method as claimed in claim 3, wherein the odor gases to be burnt originate from pulp digesting, evaporating plant, heat treatment and causticizing.

9. Method as claimed in claim 3, wherein at least part of the biofuel is bark, wood chips, sawdust or other waste generated in wood processing at the mill.

10. Method as claimed in claim 3, wherein at least part of the biofuel is peat or straw.

11. The method of claim 4, wherein the power boiler is a fluidized bed boiler.

12. The method of claim 11, wherein the fluidized bed boiler is a bubbling fluidized bed boiler.

* * * * *